(12) United States Patent
Porte

(10) Patent No.: US 6,227,485 B1
(45) Date of Patent: May 8, 2001

(54) OPENING DEVICE COMMON TO TWO ADJACENT AIRCRAFT ENGINE NACELLE COVERS

(75) Inventor: Alain Porte, Colomiers (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/297,887

(22) PCT Filed: Dec. 2, 1998

(86) PCT No.: PCT/FR98/02596

§ 371 Date: Jun. 21, 1999

§ 102(e) Date: Jun. 21, 1999

(87) PCT Pub. No.: WO99/28188

PCT Pub. Date: Jun. 10, 1999

(30) Foreign Application Priority Data

Dec. 21, 1998 (FR) .................................................. 97 15226

(51) Int. Cl.⁷ ........................................................ B64C 1/16
(52) U.S. Cl. .......................... 244/54; 244/53 B; 60/39.31
(58) Field of Search ..................................... 244/54, 53 B, 244/55, 62; 60/39.31

(56) References Cited

U.S. PATENT DOCUMENTS

| | | | |
|---|---|---|---|
| 4,037,809 | * | 7/1977 | Legrand .................................. 244/54 |
| 4,043,522 | * | 8/1977 | Vetter ..................................... 244/54 |
| 4,399,966 | | 8/1983 | Crudden et al. .................. 244/129.4 |
| 4,440,068 | | 4/1984 | Tootle .................................. 92/85 A |
| 5,251,435 | * | 10/1993 | Pauley ..................................... 244/54 |
| 5,372,338 | * | 12/1994 | Carlin et al. ........................... 244/54 |

FOREIGN PATENT DOCUMENTS 0 393 259   10/1990   (EP) .

* cited by examiner

Primary Examiner—J. Woodrow Eldred
(74) Attorney, Agent, or Firm—Burns, Doane, Swecker & Mathis, LLP

(57) ABSTRACT

A single actuator (35) is controlled so as to successively open two covers (4 and 5) on an aircraft engine nacelle which are adjacent, successively forming two hinges (40 and 47).

15 Claims, 22 Drawing Sheets

OPENING DEVICE COMMON TO TWO
ADJACENT AIRCRAFT ENGINE NACELLE
COVERS

DESCRIPTION

This invention relates to a common opening device for two adjacent aircraft engine nacelle covers.

Aircraft engines are enclosed in nacelles, some parts of which are movable covers which can open so that access can be gained to the engine.

Conventionally, these covers have transverse sections in the form of an arc of a circle, are articulated on a mast secured to the wing or to a fixed element of the nacelle by their top edge and are provided with locking means at their bottom edge so as to keep them normally closed. The method of opening the covers consists of undoing the locking means before lifting the covers and holding them in the open position by disposing spacing rods, often telescopic, between the covers and the engine enclosed by the nacelle.

The covers are lifted by hand if they are sufficiently light or by operating actuators articulated between them and a fixed point on the mast in the contrary case. In the first case, an operator must at least hold the cover raised whilst another installs the rod holding them in this open state; a single operator is necessary if the cover is lifted by an actuator, since he puts the safety rod in place after having controlled the deployment of the actuator.

Certain aircraft engines have the particular situation of two adjacent covers, one being sufficiently light to be lifted by hand but the other requiring the use of a lifting actuator. Several operators are used for lifting the first cover and installing the rod as above and then for controlling the actuator for the second cover and installing its rod.

This design combines the drawbacks of the two simple designs since use is made of several operators for opening the covers and an actuator for opening one of them. An attempt could be made to provide each of the covers with an actuator so as to have to need only one operator, but the design of the nacelle will be complicated and made more expensive by the addition of a second actuator.

The invention represents a better solution to this problem of using several operators successively to open two covers on an aircraft engine nacelle. To summarise, it consists of a novel construction of the nacelle in which the same actuator is successively connected to the two covers in order to lift them.

The aircraft engine nacelle comprises two adjacent covers each having a top edge articulated on the mast and an actuator for opening a first of the covers, articulated at a fixed point on the engine and connected to the first cover by a first hinge (which can, like the following one, take various appearances such as that of a fork), and this nacelle is original in that the first hinge is separable and comprises a hinge element belonging to the actuator, and the second of the covers comprises a hinge element which can form a separable hinge with the hinge element belonging to the actuator, the second hinge being able to be formed in a state of retraction of the actuator and of closure of the second cover and in a state of extension of the actuator and opening of the second cover. Thus the invention can be defined in its most general form as an aircraft engine nacelle comprising two adjacent covers, which are special in that a first one of the covers partially overlaps one of the second covers, imposing an order of opening and closing, the covers each having an edge articulated on a suspension mast on the nacelle or on a fixed element secured to the mast and engine, and an opening actuator connected to the first cover in a position where the first cover is closed by a first hinge and articulated by a second hinge on the engine, characterised in that, by rotation about the second hinge, the actuator can be successively connected to the first cover or to the second cover without being disconnected from the other hinge and without disconnecting its supply or control system, and in that bringing into service is controlled by a control element concealed by the cover and close to an opening edge opposite to the articulated edge of the first cover, when this cover is in the locked position.

If the actuator is hydraulic, the nacelle can comprise an actuator control system composed essentially of a pump, a liquid reservoir and a valve allowing passage of liquid from the reservoir to the actuator through the pump and a passage of liquid direct from the actuator to the reservoir.

If the actuator is electrically controlled, it can be controlled by a switch situated behind the opening edge of the first cover.

These details of the invention and others will be understood more clearly from the disclosure of the following figures, which depicts a particular embodiment thereof in its technical context:

Figure 3:
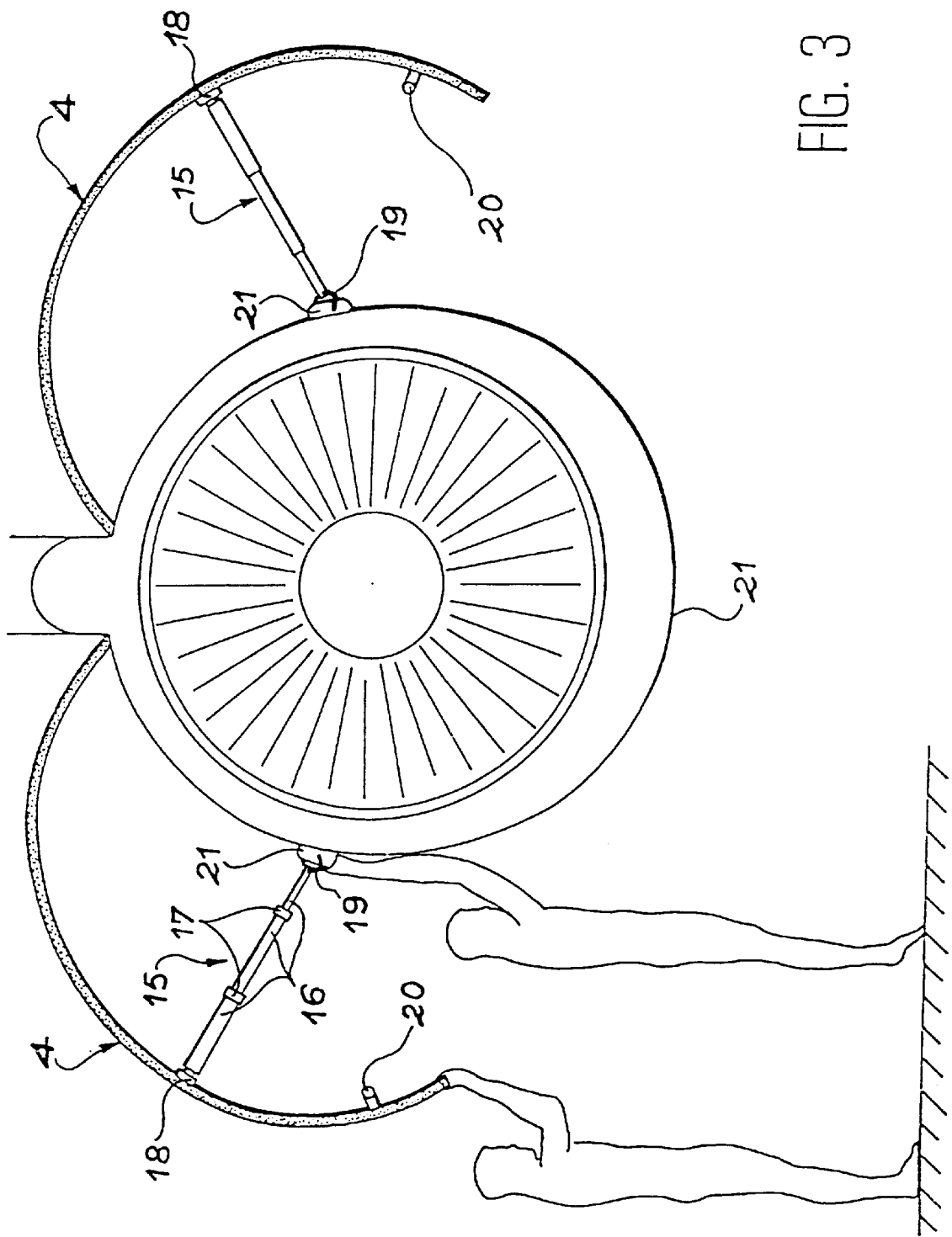
FIG. 3 illustrates the final phase of manual opening of a cover.
Figure 4:
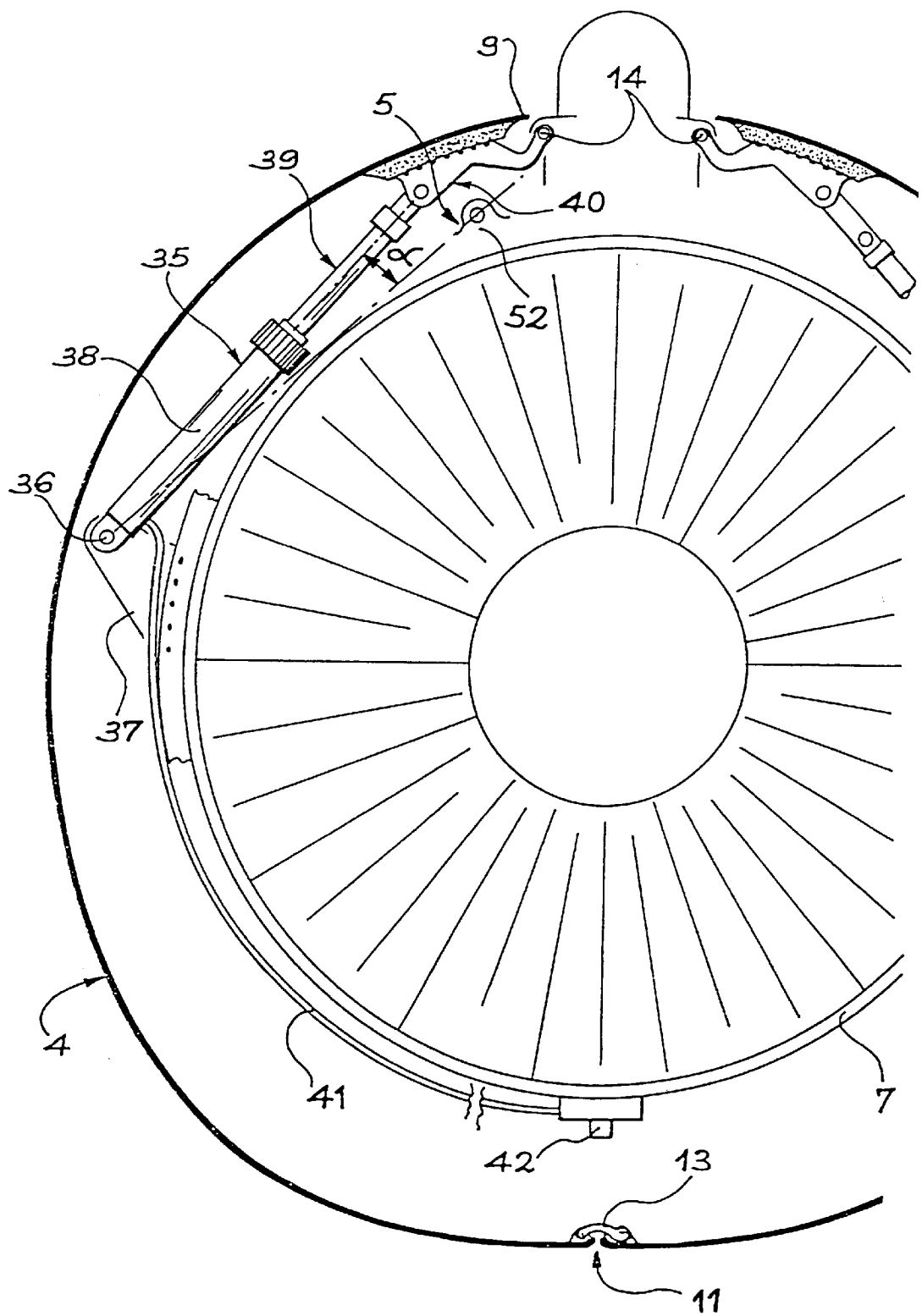
FIG. 4 depicts the invention in the state of closure of the covers.
Figure 5:
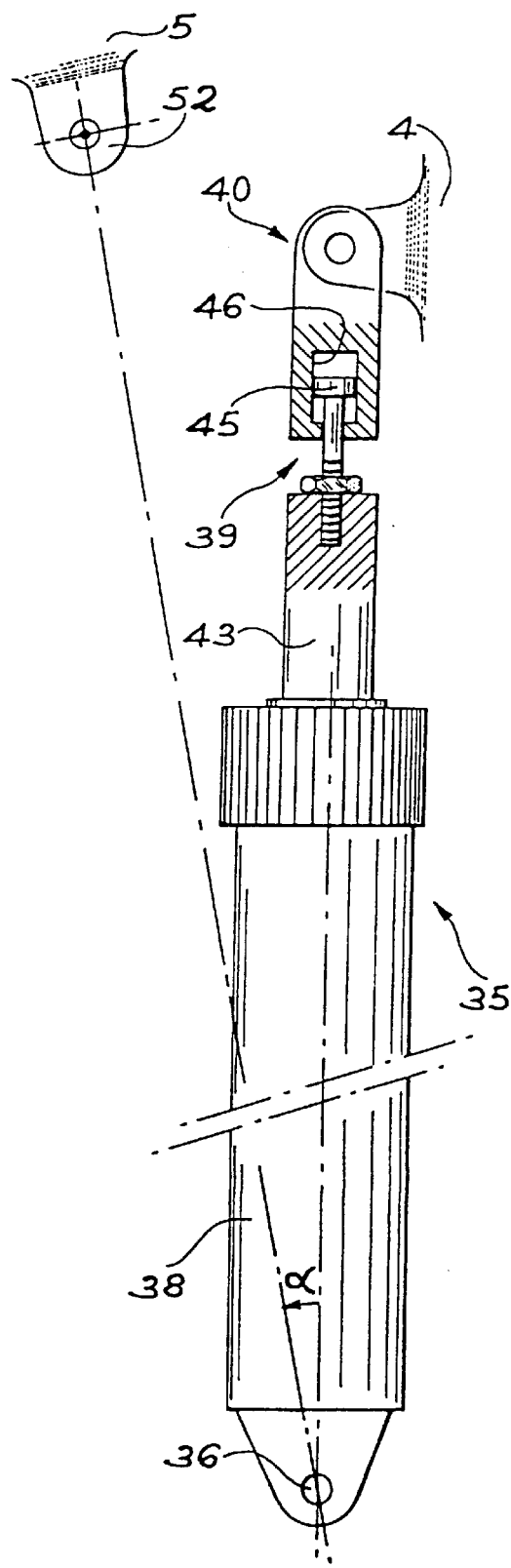
FIG. 5 illustrates the actuator of the invention.
Figure 12:
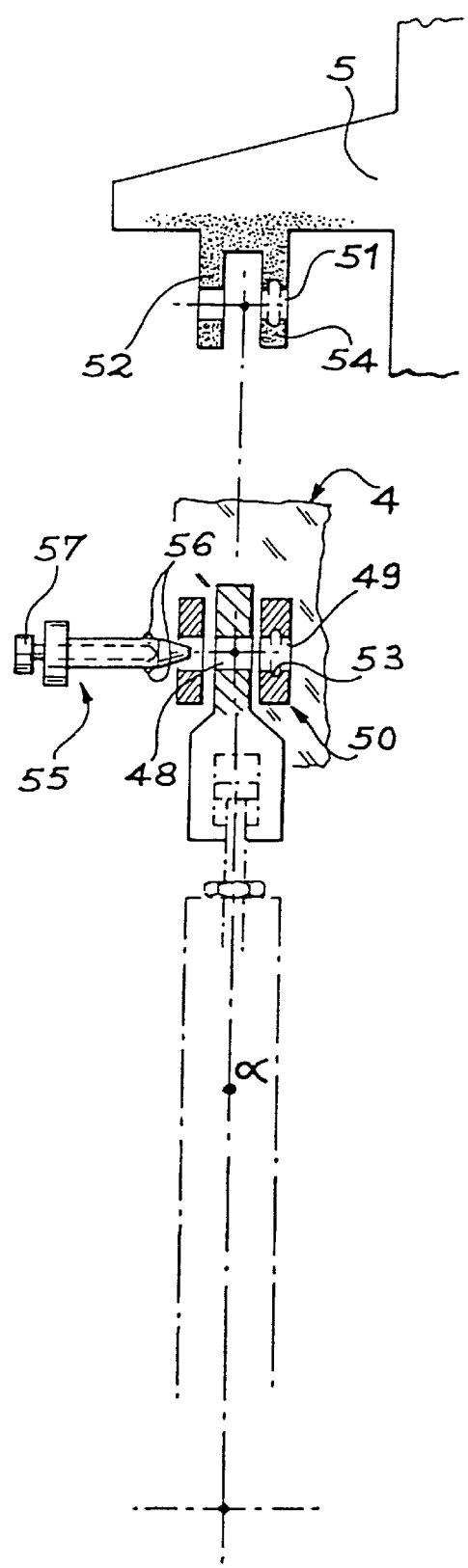
Figure 8:
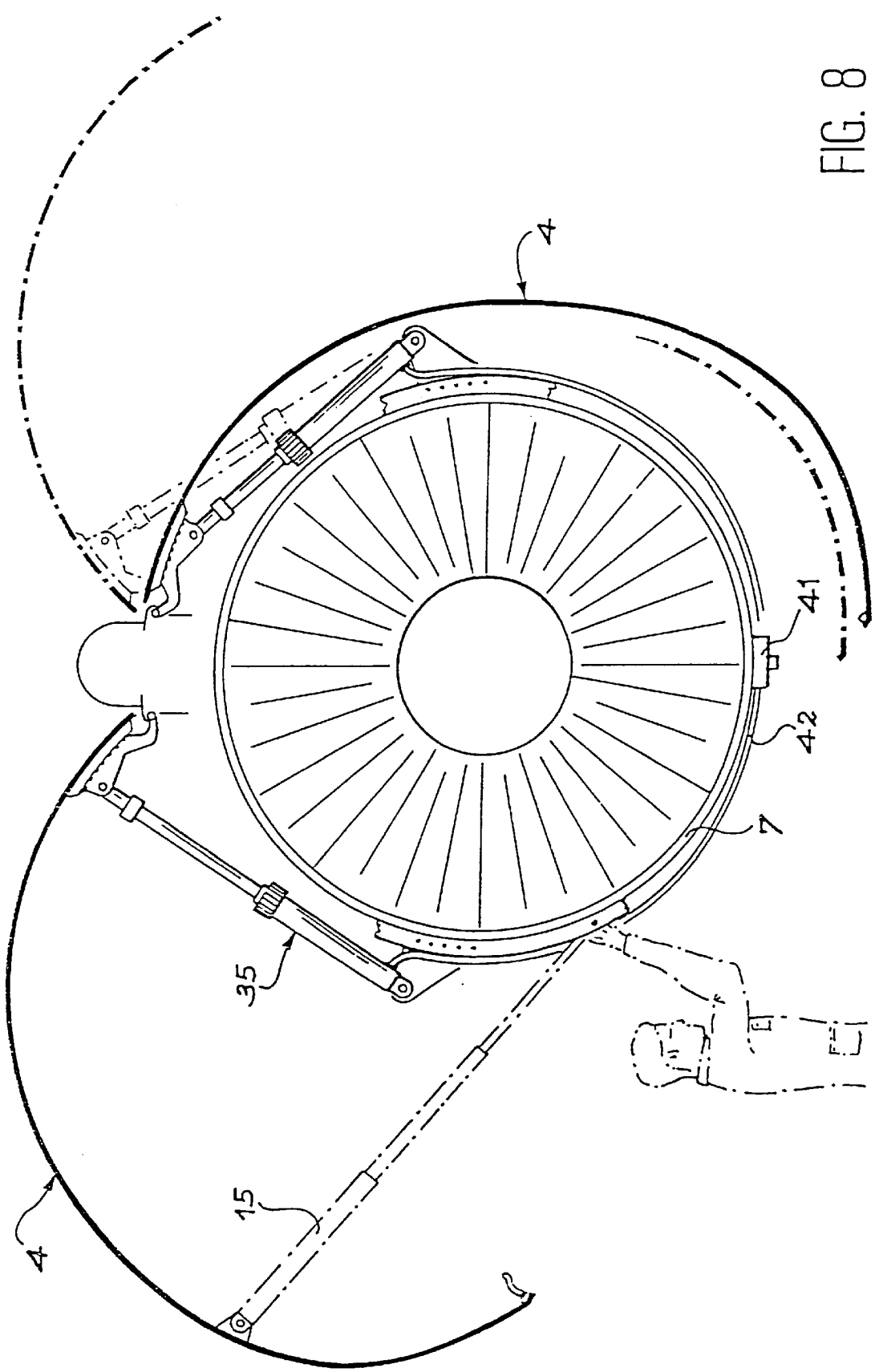
Figure 9:
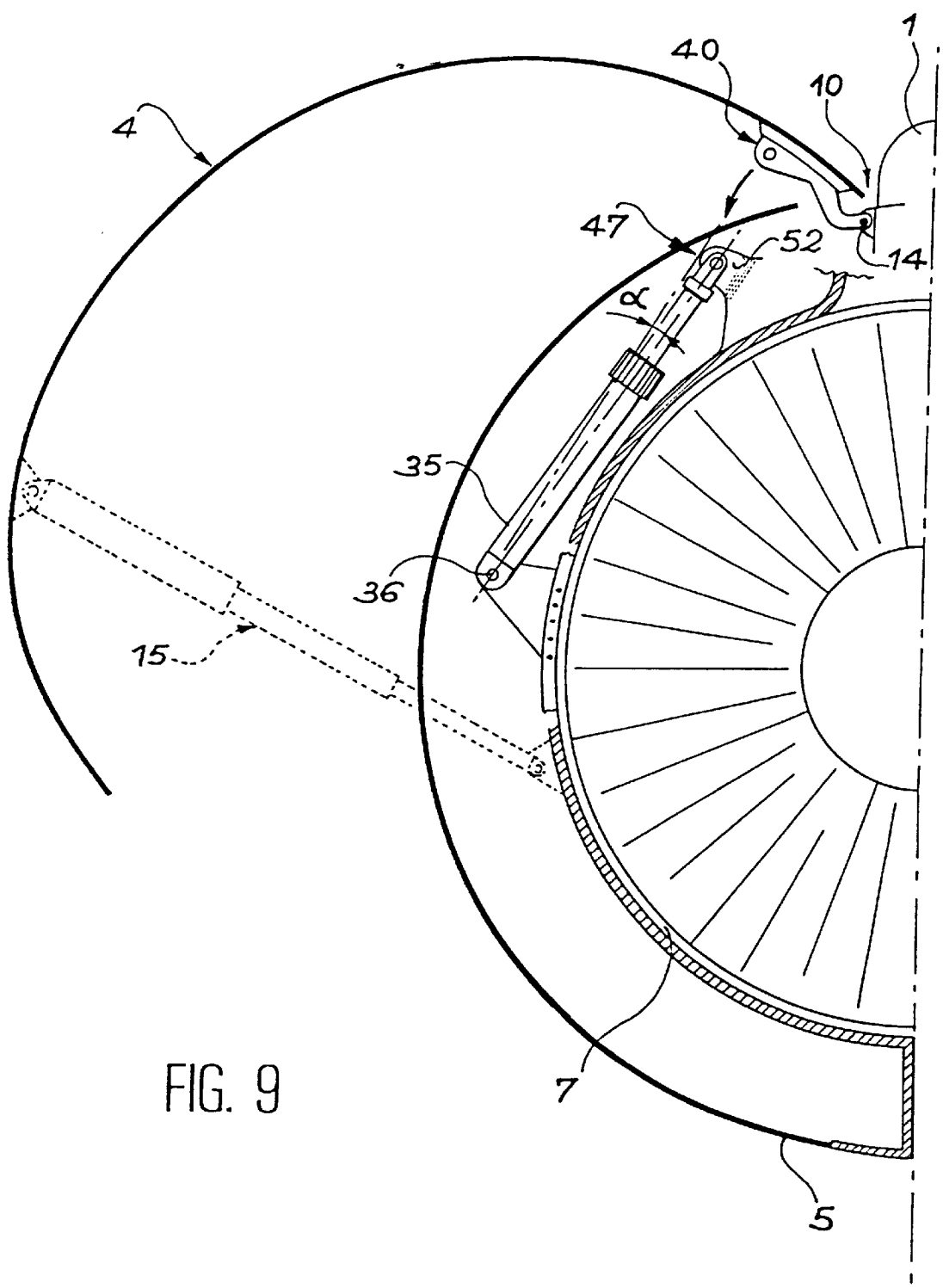
Figure 10:
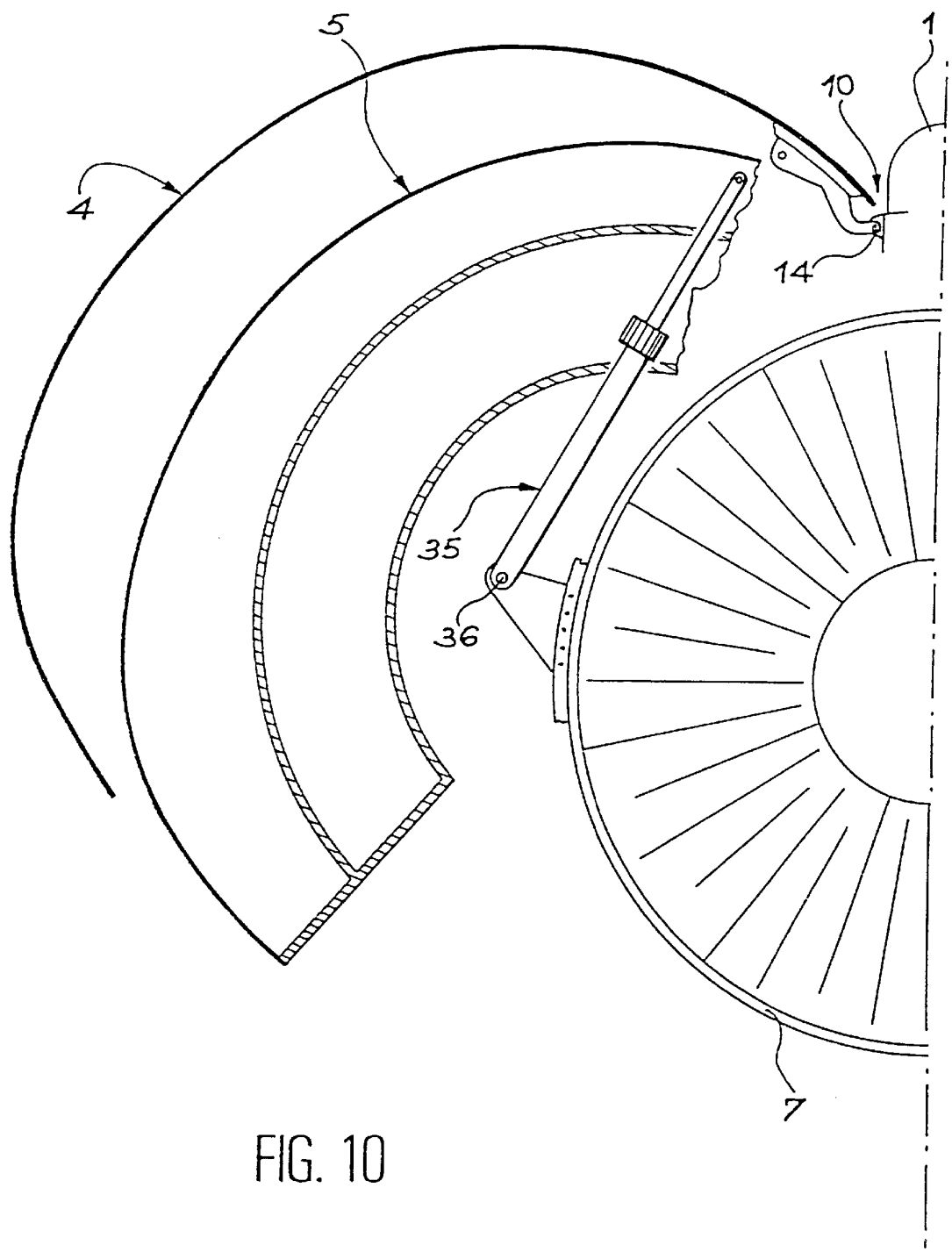
Figure 11:
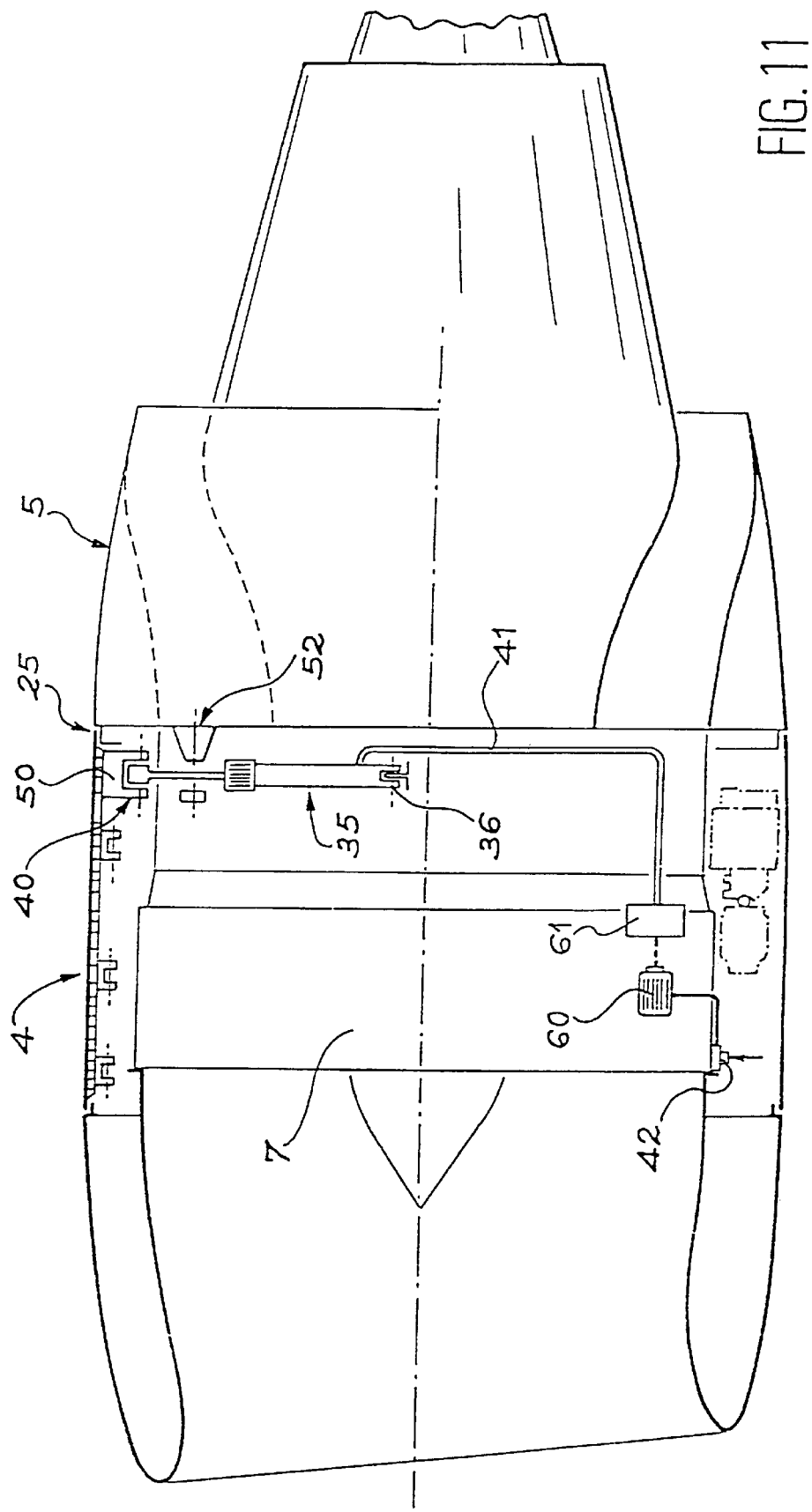
Figure 13:
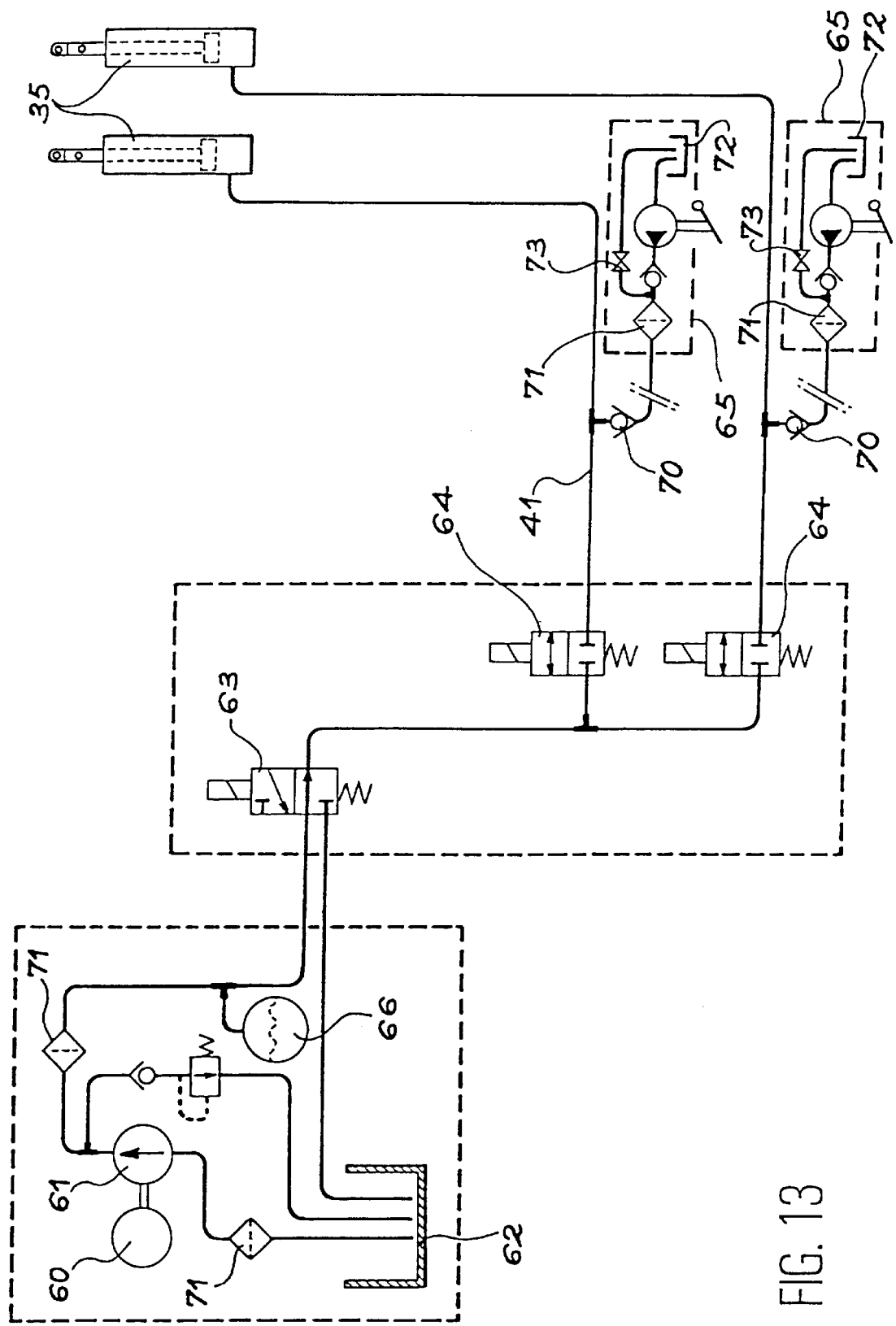
Figure 14:
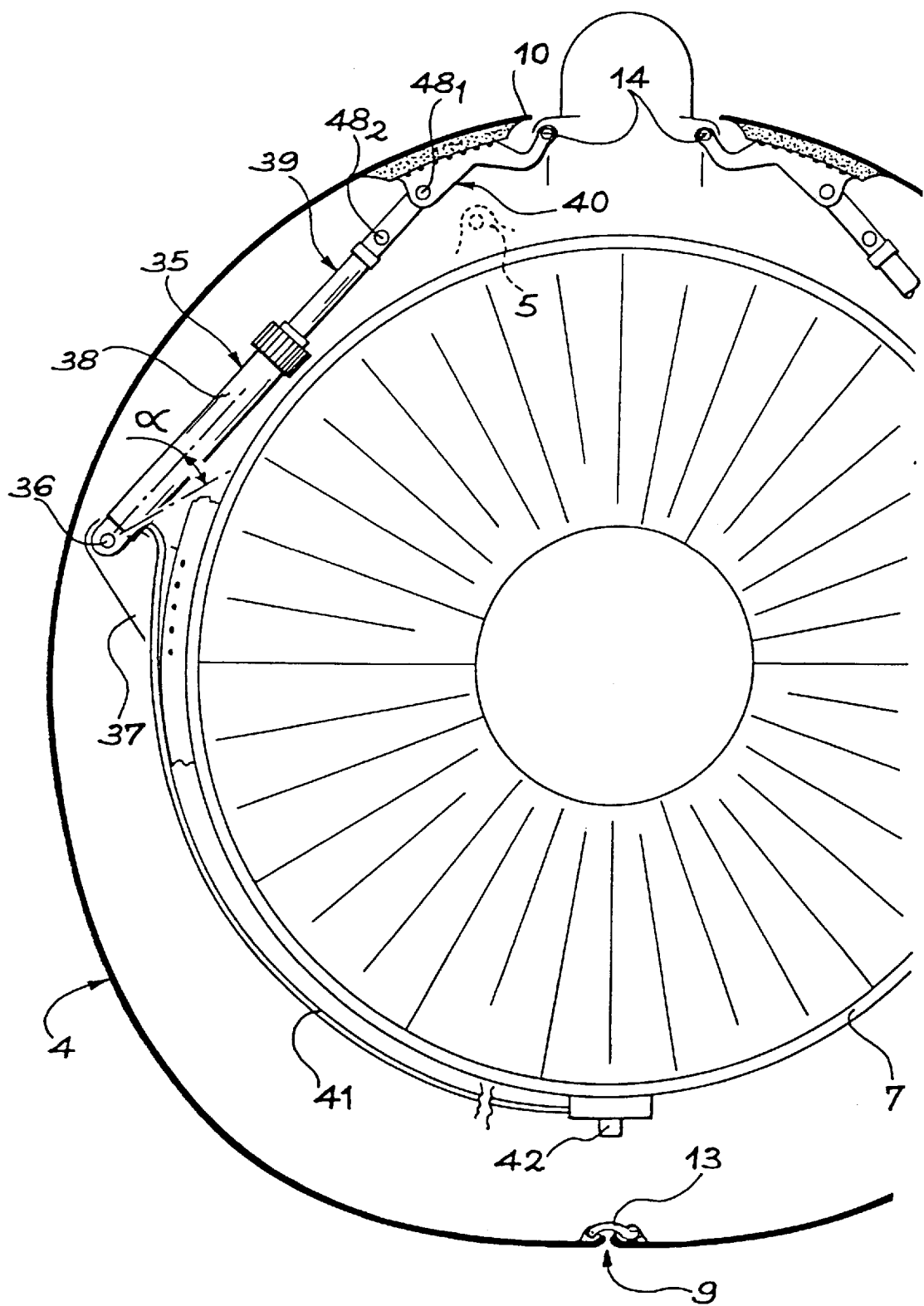
Figure 15:
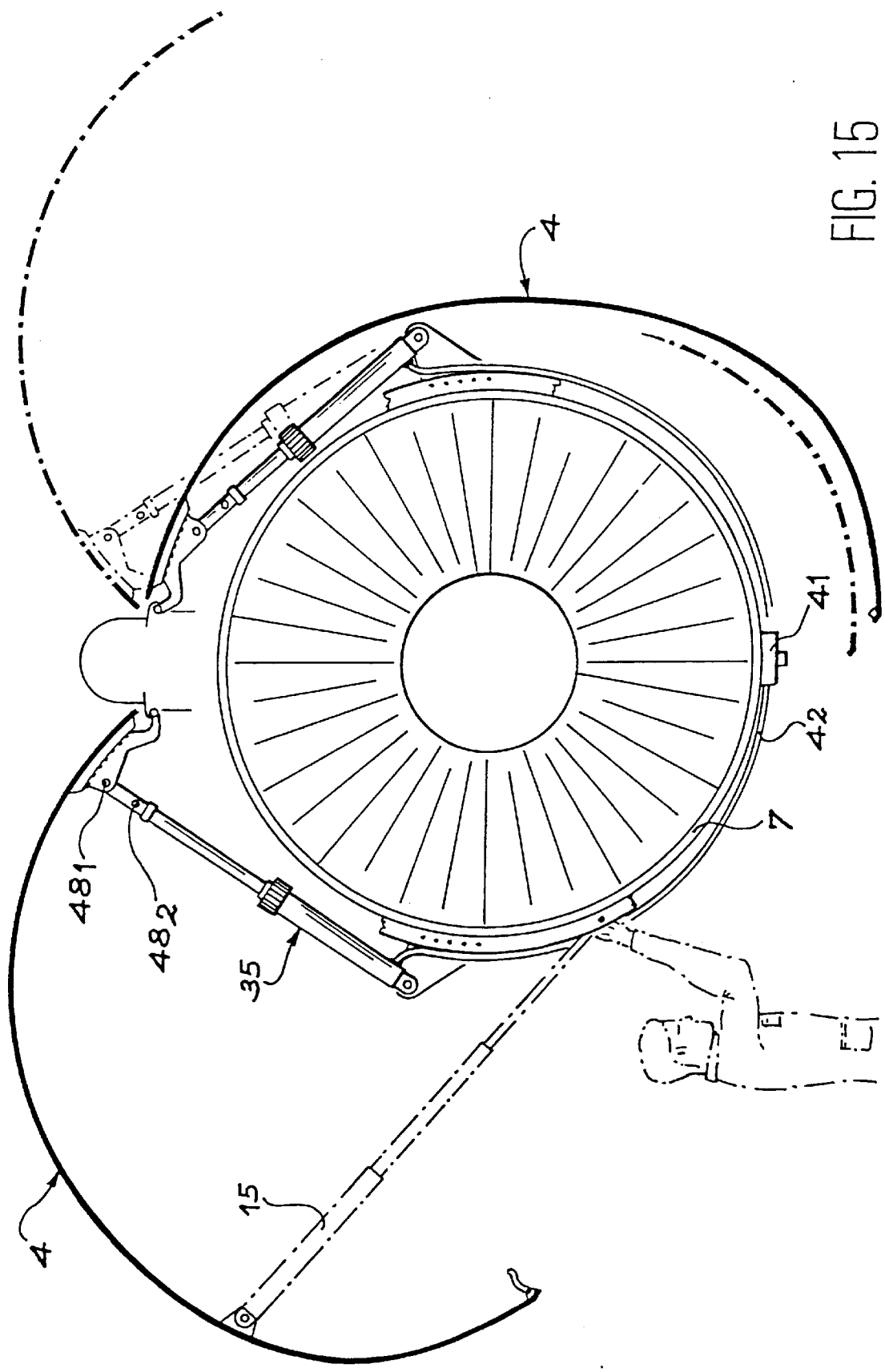
Figure 16:
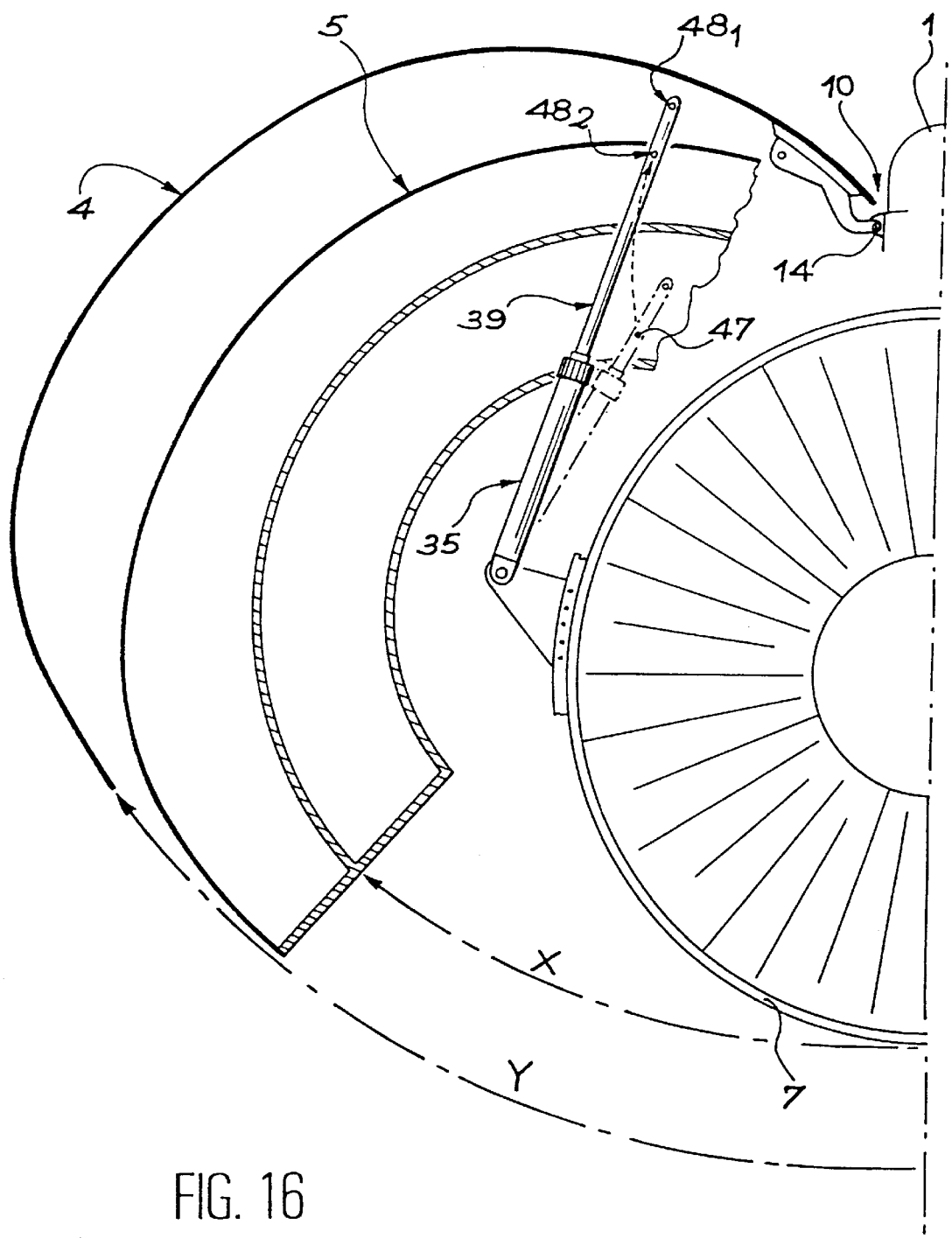
Figures 17, 19:
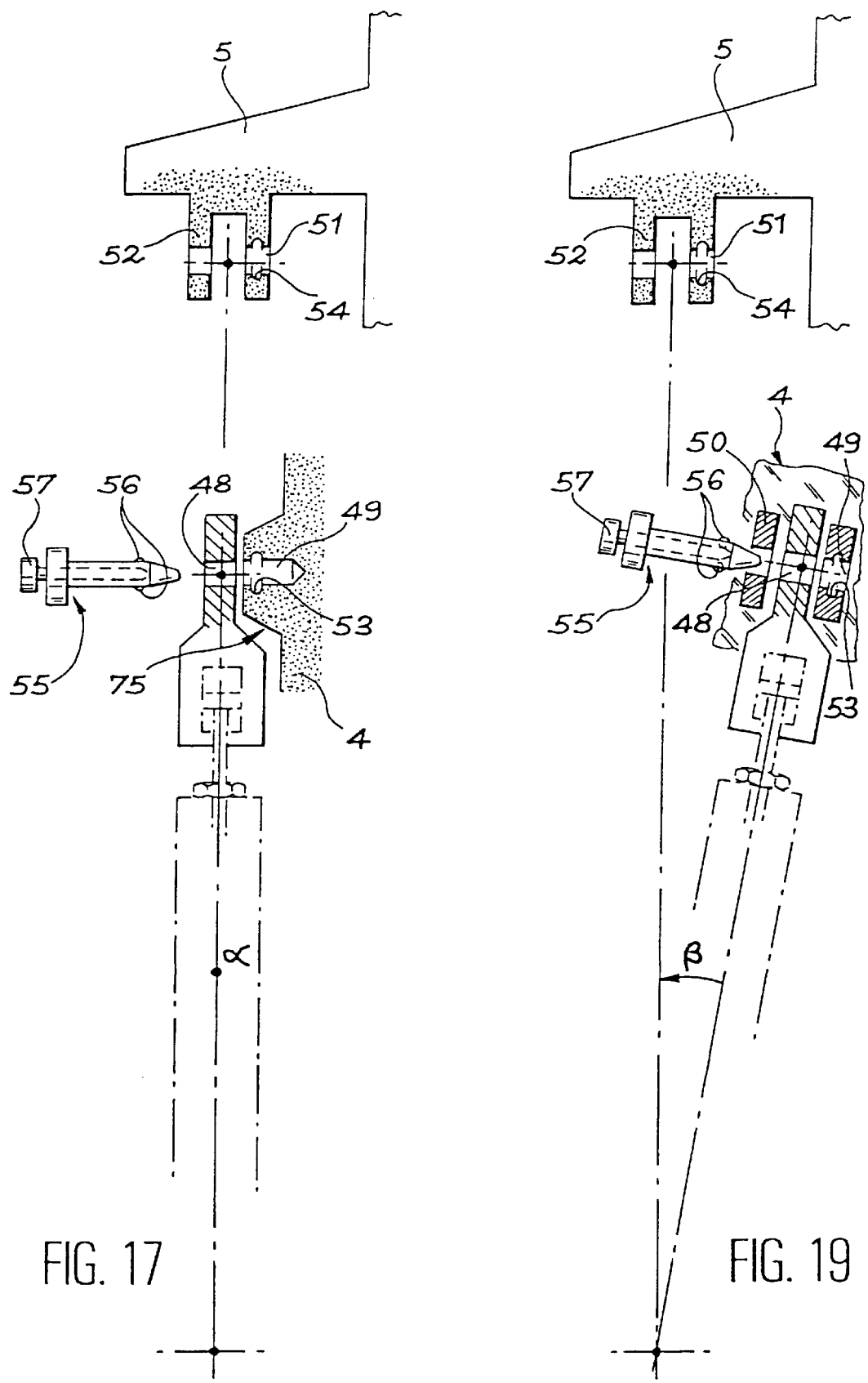
Figure 18:
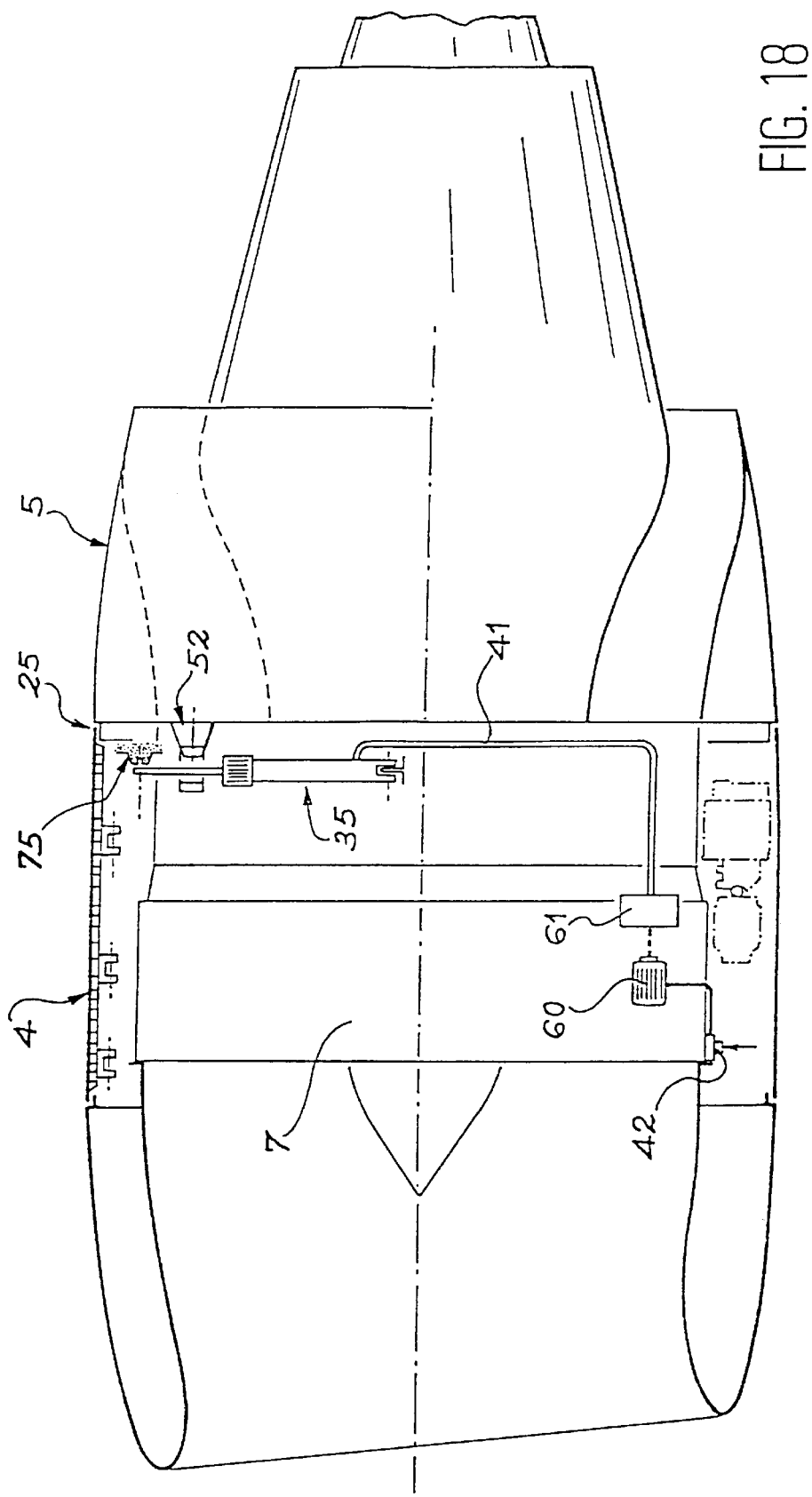
Figure 20:
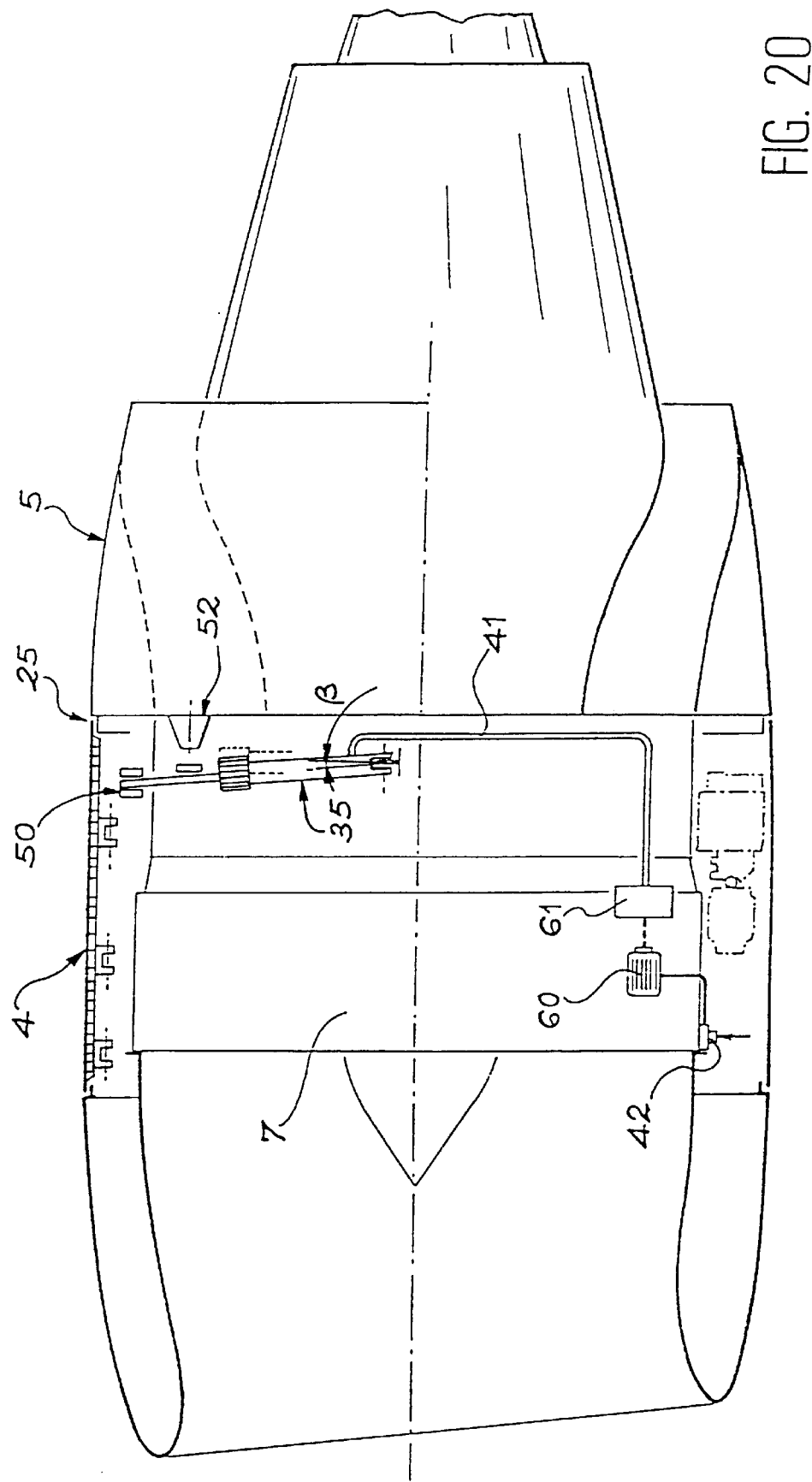
Figure 21:
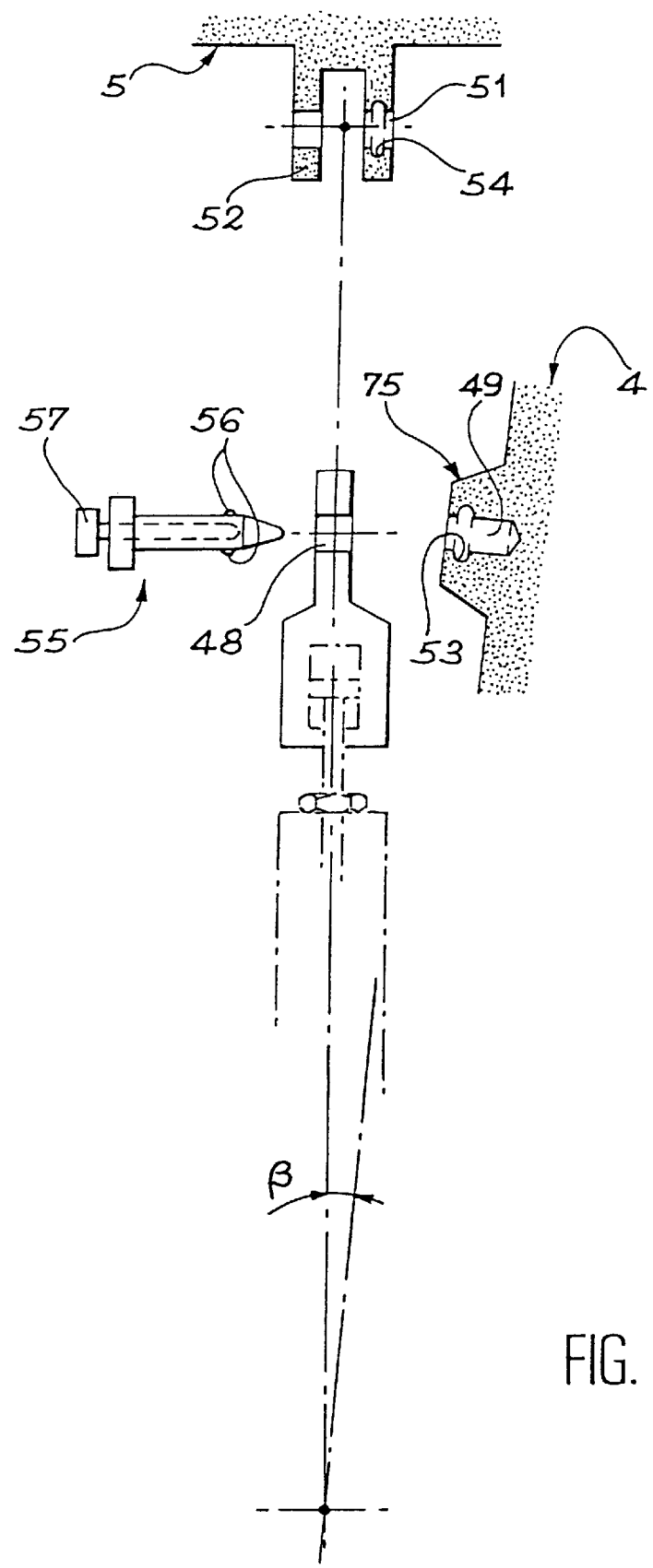
Figure 22:
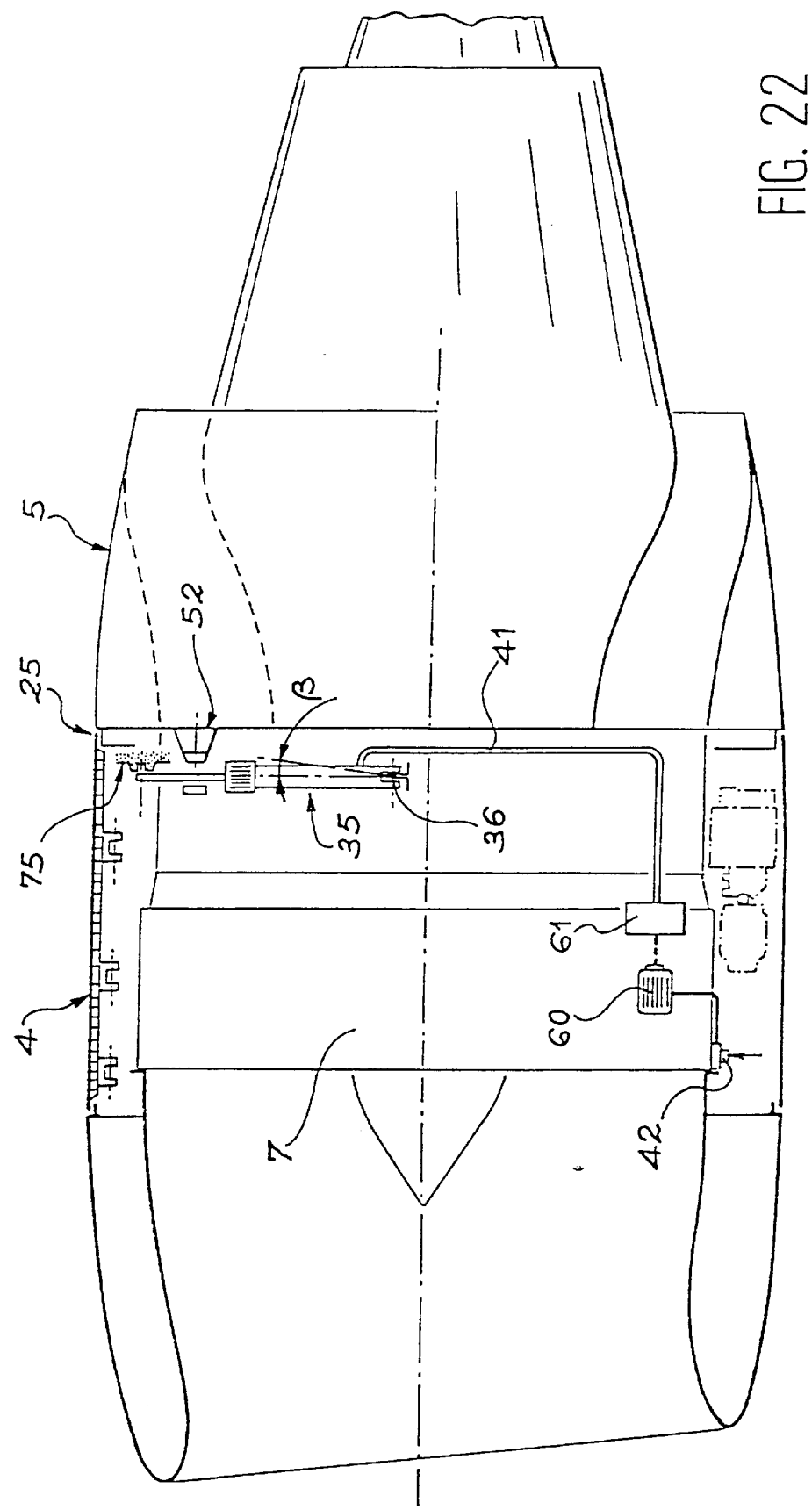
Figure 23:
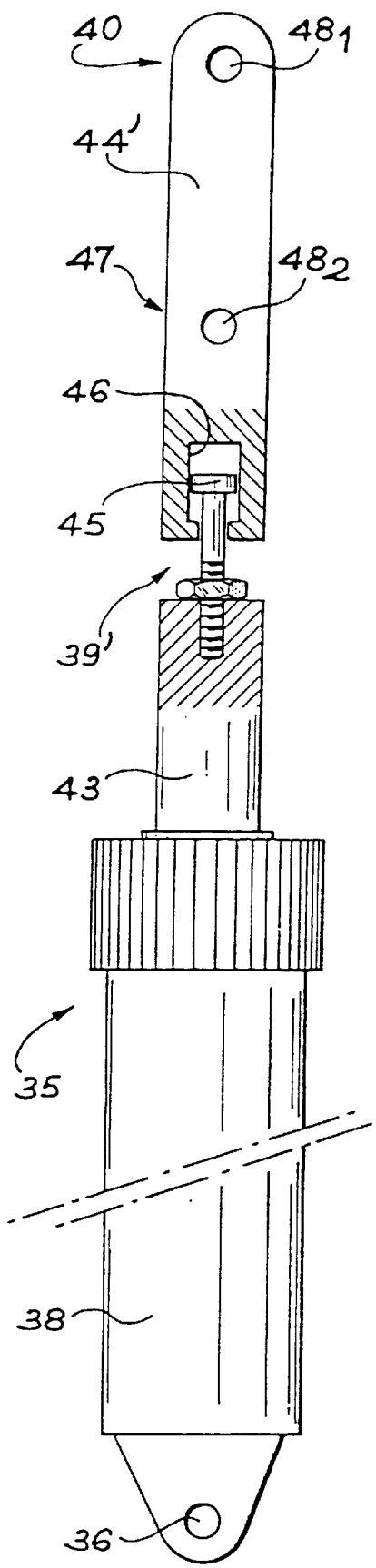
Figure 24:
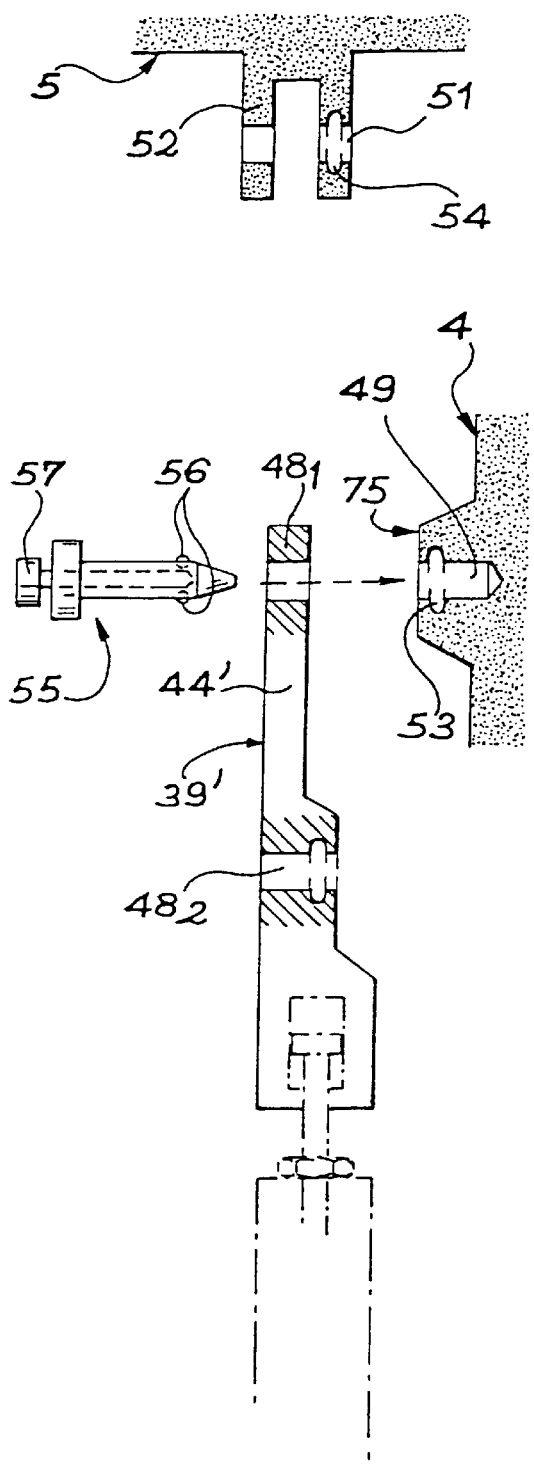
Figure 25:
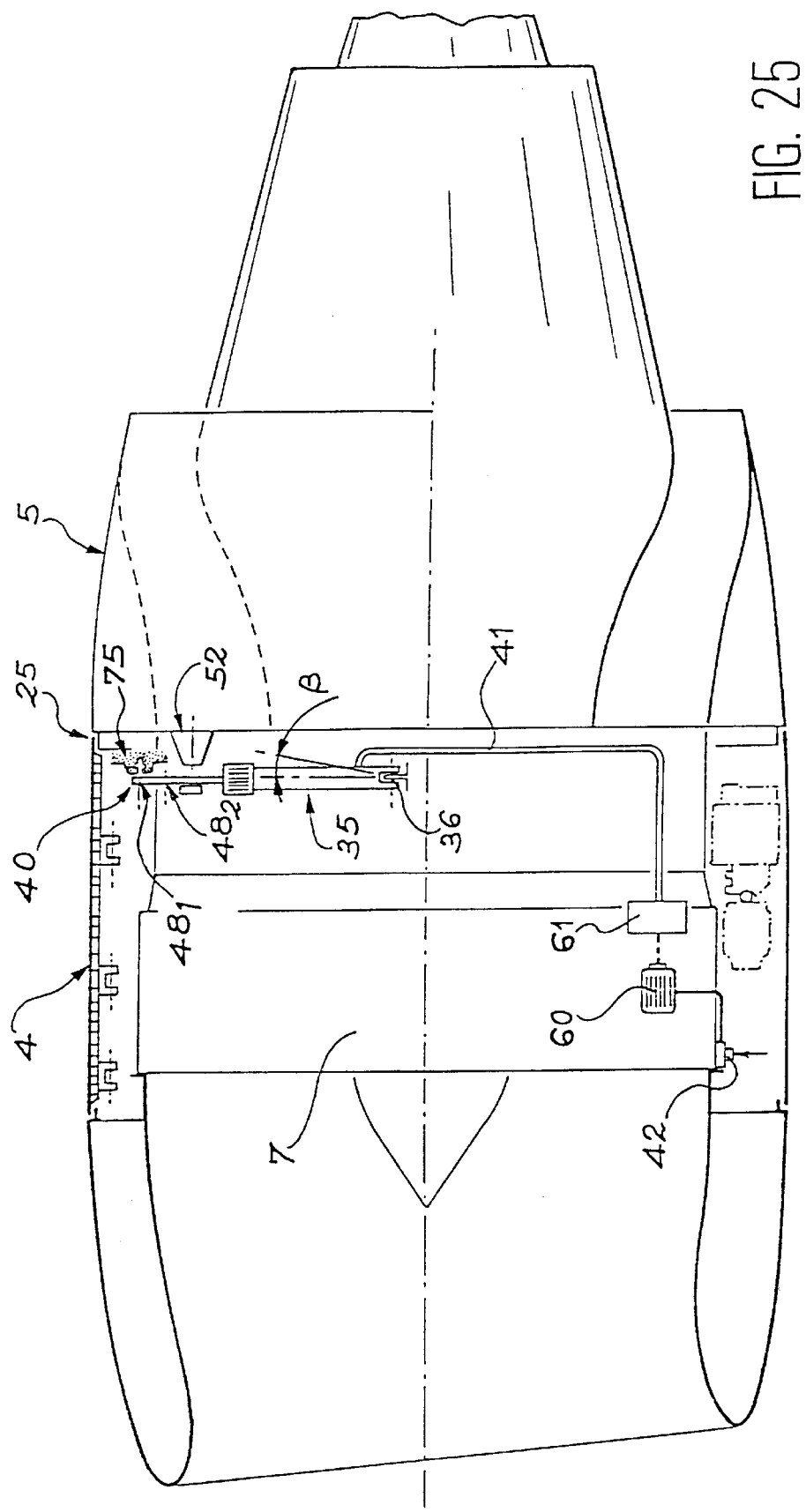

FIG. 8, corresponding to FIG. 3, illustrates the final phase of opening of the first cover with the invention;

FIG. 9 illustrates a change in connection of the actuator in order to open the second cover;

FIG. 10 illustrates the opening of the second cover with the invention;

FIG. 11 depicts the disposition of the actuator at the junction of the covers according to a view of the nacelle in longitudinal section;

FIG. 12 depicts the design detail of the hinges between actuator and covers;

FIG. 13 details the actuator control components;

FIGS. 14, 15 and 16 illustrate steps of opening of the covers, corresponding to FIGS. 4, 8 and 10 for a second embodiment of the invention;

FIGS. 17 and 18 correspond to FIGS. 12 and 11 for a third embodiment of the invention;

FIGS. 19 and 20 correspond to FIGS. 12 and 11 for a fourth embodiment of the invention;

FIGS. 21 and 22 correspond to FIGS. 12 and 11 for a fifth embodiment of the invention;

FIG. 23 is a view of an actuator similar to FIG. 5 for the second embodiment of the invention;

FIGS. 24 and 25 correspond to FIGS. 12 and 11 for a sixth embodiment of the invention.

Figure 1:
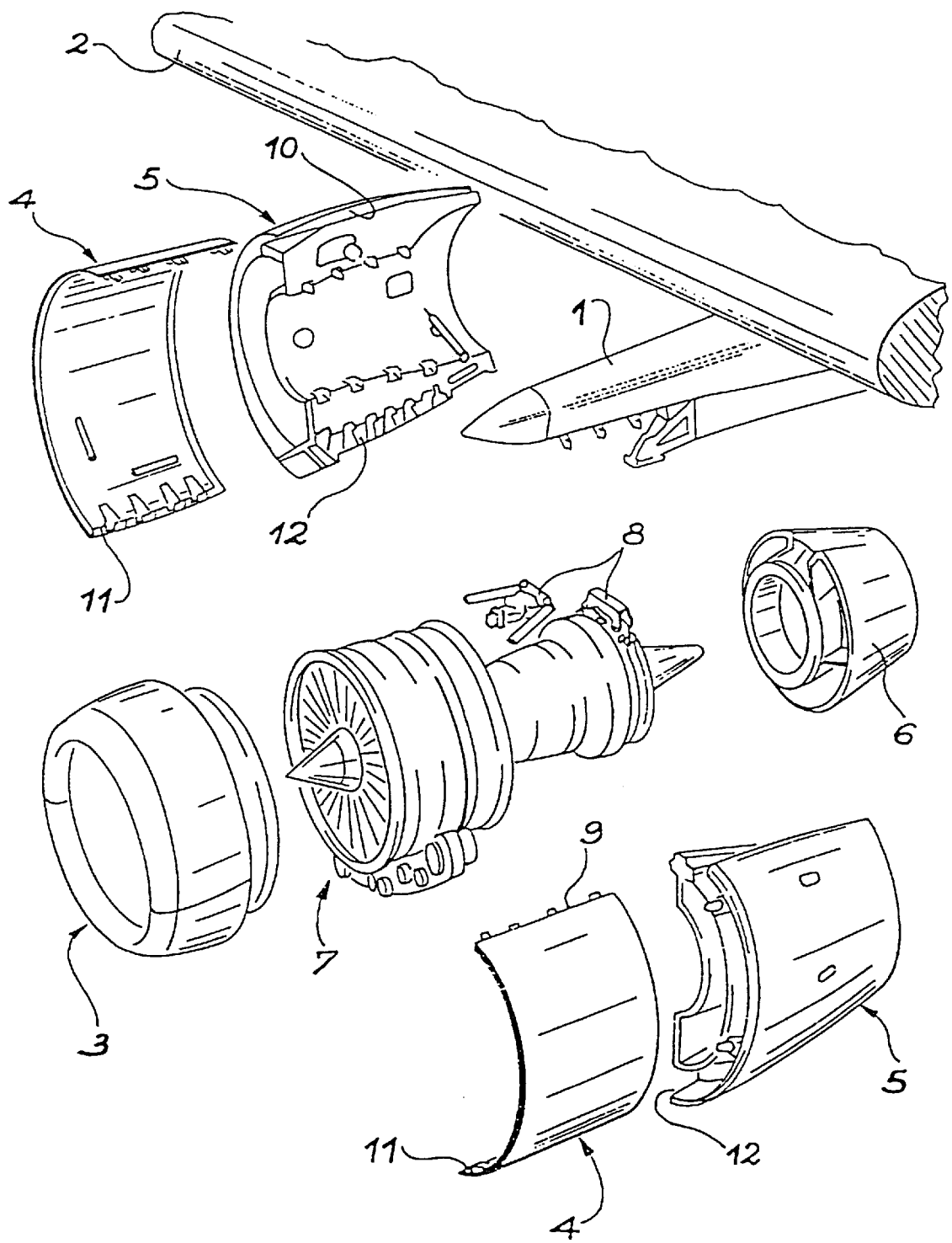
FIG. 1 is an exploded view of an aircraft engine nacelle.

FIG. 1 depicts an existing nacelle for an aircraft engine. This enclosure is suspended from a mast 1 on an aircraft wing 2 which is merely sketched and is composed, from front to rear, of an air inlet 3, a pair of turbine covers 4 to left and right, a pair of thrust reverser covers 5, also to left and right, and an annular nozzle 6. The engine 7, encased in the nacelle, is suspended from the mast 1 by two mounting members 8 to front and rear. The turbine covers 4 and thrust reverser covers 5 are in the shape of an arc of a circle and articulated by the top edges, respectively 9 and 10, from the mast 1, and the bottom edges 11 and 12 carry locking means which connect the turbine covers together and the thrust reverser covers 5 together. These locking means are depicted schematically in FIGS. 2 and 4 under the reference 13. They are not described in detail since the invention does not relate to them and they are not modified, nor are the hinges 14 for articulation on the mast 1.

The turbine covers 4 and thrust reverser covers 5 are adjacent and the turbine cover 4 slightly overlaps the thrust reverser cover 5, at the rim 25, visible in FIG. 11.

Figure 2:
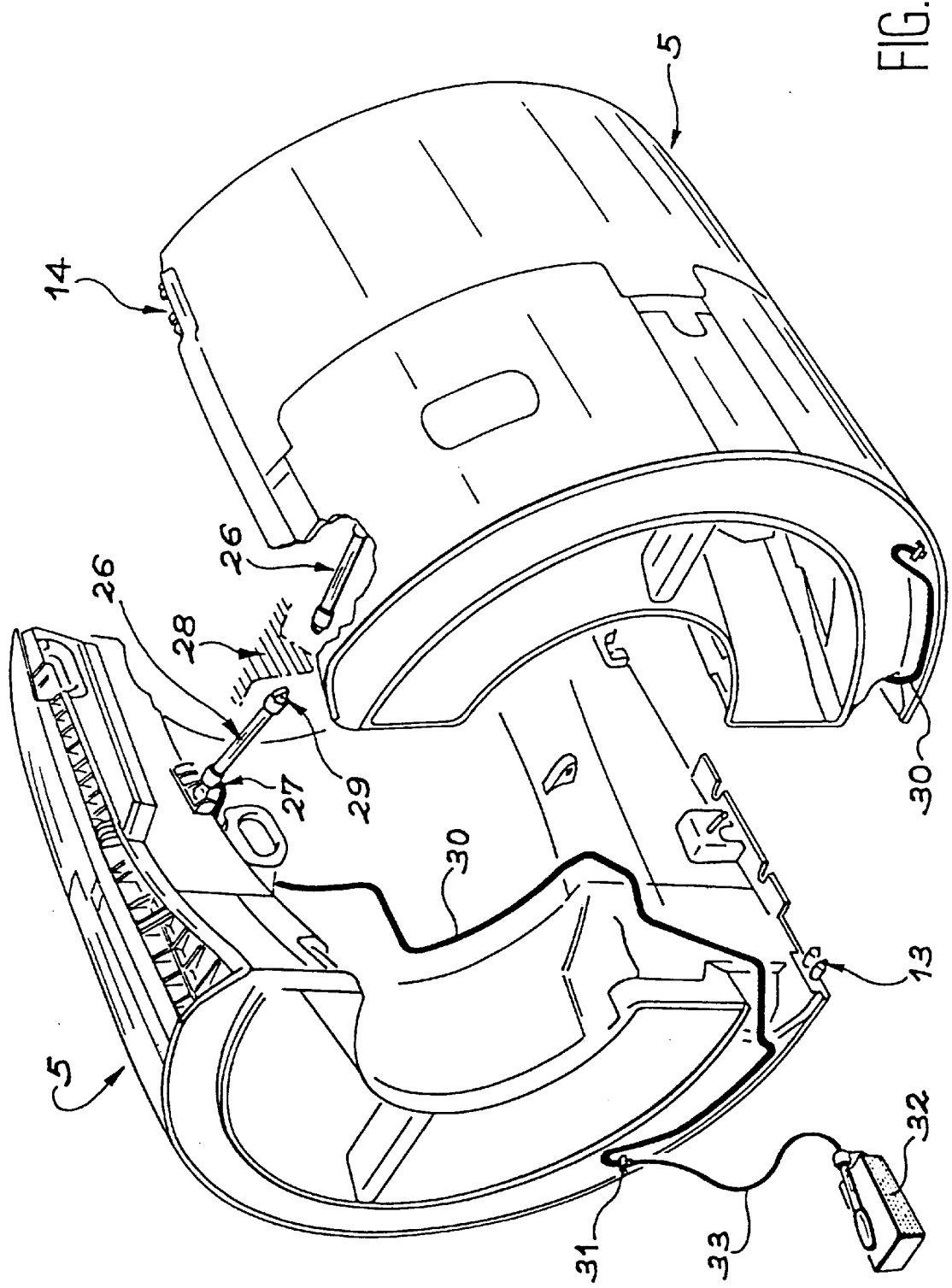
FIG. 2 illustrates the opening of a cover by an actuator.

In a conventional method, the turbine covers 4 are lifted by hand, but the thrust reverser covers 5, which are heavier, are provided with the lifting device illustrated in FIG. 2. This consists of actuators 26 associated with each of the covers 5 in the pair, articulated by a first end to the covers 5 by a hinge 27 and by an a opposite end to attachment lugs 28 forming fixed points on the mast by a second hinge 29. The actuators 26 are hydraulic actuators fed by pipes 30 running along the covers, towards the bottom and front of the thrust reverser as far as a connection 31 situated on the front rim 25 and which is therefore uncovered when the turbine covers 4 are open. A manual pump 32 terminating in a connecting tube 33 can be connected to the connection 31 in order to fill the conduit 30 progressively and deploy the actuator 26.

Rods are employed to keep the covers open. FIG. 3 depicts the rods 15 allocated to the turbine cover 4: they are composed of a certain number of sections 16, three for example, able to slide in each other and connected by locking mechanisms 17 enabling them to be held in the deployment position. The rods 15 have a top end 18 articulated on the turbine covers 4 half way up them and a bottom end 19 fashioned as a clamp and held initially in a handle 20 on the turbine cover 4. A final step of opening of the turbine covers 4 is depicted here, where an operator installs the clamp 19 on a handle 21 of the engine 7 after having detached it from the handle 20 and after having deployed the sections 16 and having locked them. Another operator keeps the cover 4 raised.

Similar rods are provided for keeping open the thrust reverser covers 5 and guarding against a failure of the actuators 26.

The actuators 26 in the known design were situated in the middle of the thrust reverser covers 5. They are replaced, for the invention, by slightly different actuators 35 situated at the front rim 25 of each side of the nacelle in order to serve successively for the respective covers 4 and 5. It can be seen in FIG. 4 that the actuators 35 are connected by an articulation 36 to an attachment lug 37 secured to the casing of the engine 7 or possibly to another fixed point on the nacelle; the actuator 35 has, as is usual, a cylinder 38, to which the articulation 36 is attached, and a stem 39, articulated on the turbine cover 4 by a hinge 40. The actuators 35 are hydraulic actuators like the previous ones 26 and are fed with hydraulic liquid by a tube 41 which extends from the cylinder 38 to a hydroelectrical supply installation comprising a control switch 42. A fragment of the first reverser cover 5 has finally been depicted, namely a fork 52, which will be described subsequently and is situated close to the hinge 40 below the turbine cover 4 and at a small angular distance α from the actuator 55 able to move about the articulation 36.

Figure 6:
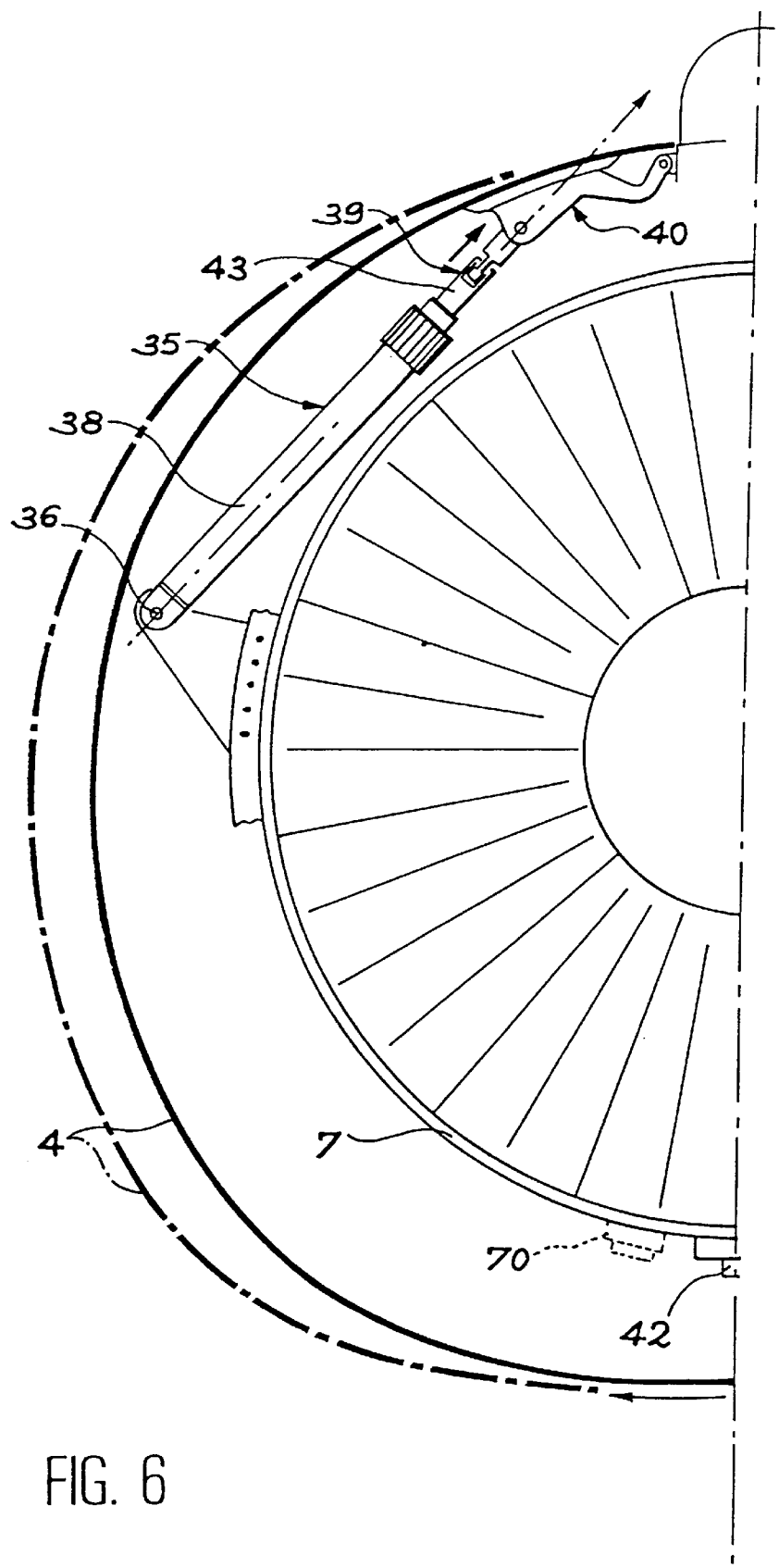
FIG. 6 illustrates a first phase of the opening of the first cover.

Before the turbine covers are opened, the switch 42 is intentionally concealed by the said covers. The opening method consists of unlocking the turbine covers 4 and opening them slightly in order to expose the switch 42 or a rapid coupling 70, which will be referred to again later; this state is depicted in broken lines in FIG. 6. This preliminary opening of the turbine covers 4 can be produced by deforming them or, preferably, by constructing the step 39 of each of the actuators 35 as indicated in FIG. 5, that is to say in two segments 43 and 44 in line with each other, the first of which is engaged in the cylinder 38 and the second of which carries the hinge 40. These segments 43 and 44 are connected by a piston 45 on one of them, held in a closed housing 46 in the other, in which it slides, which enables the segments 43 and 44 to have play in the axial direction over a short travel. If such an arrangement is adopted, the turbine cover 4 can be opened without effort by moving the segments 43 and 44 of the stem 39 closer to each other.

Figure 7:
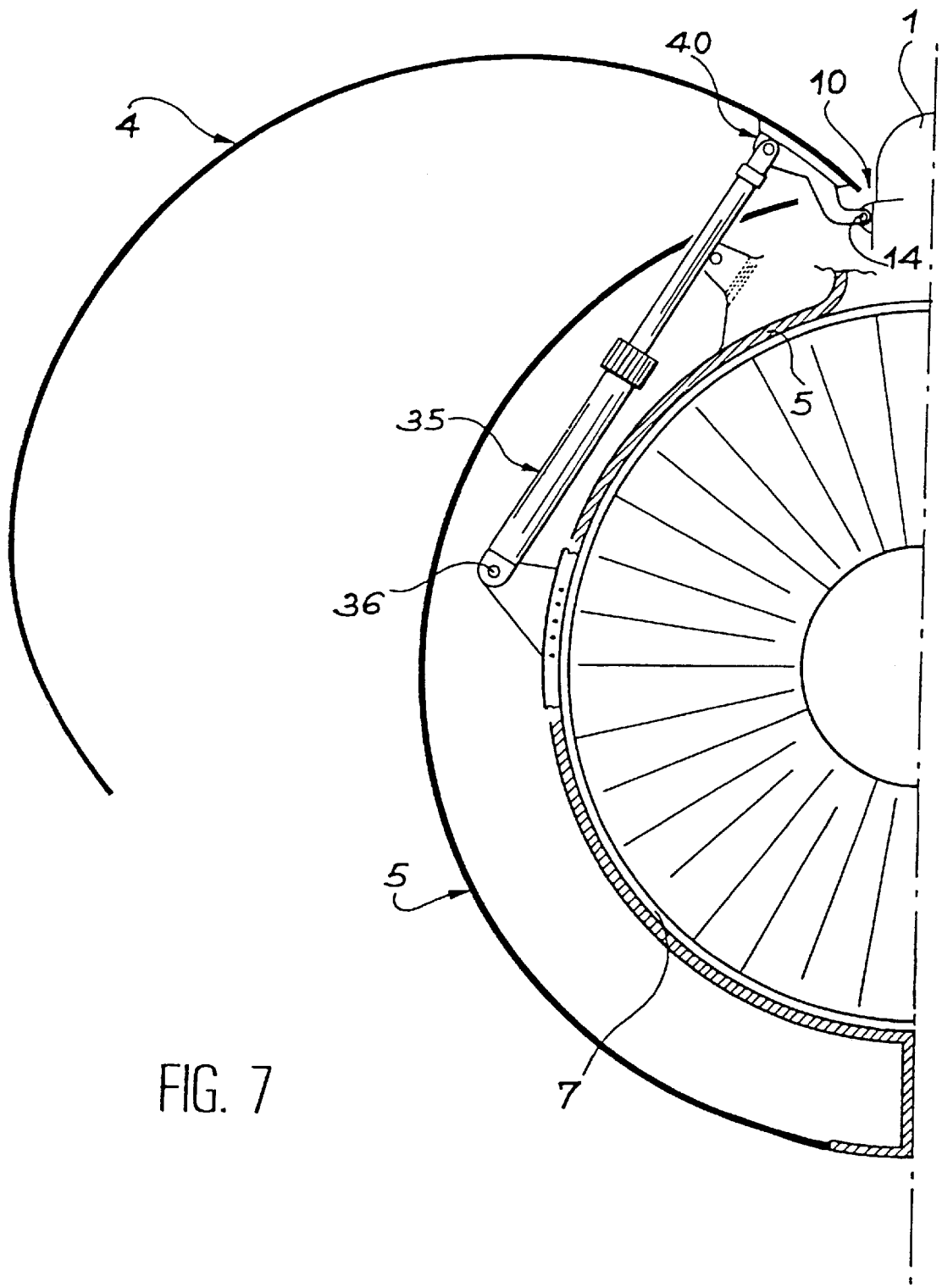
FIG. 7 illustrates the state of greatest extension of the actuator.

The operator then presses on the switch 42 in order to control the deployment of the actuators 35 until the turbine covers 4 are completely open and raised, after which he installs the rods 15 as indicated in FIG. 3. The other operator in this figure, who held the turbine cover 4, becomes unnecessary because of the actuator 35. These manoeuvres and the corresponding state of the actuator 35 are illustrated in FIGS. 7 and 8.

Next the opening of the thrust reverser covers 5 is dealt with. FIG. 9 shows that the same actuators 35 are employed for this: the stem 39 is connected by a second hinge 47 to the thrust reverser cover 5, whilst the first hinge 40 which connected it to the turbine cover 4 is disconnected. The actuator 35 is retracted so that the second hinge 47 can be formed whilst the thrust reverser cover 5 is closed, and then the actuator 35 is fed once again in order to deploy it and raise the thrust reverser cover 5 (depicted by FIG. 10) before installing the rod which holds it in the open position and which, not being modified with the invention, is not depicted; it is similar to the rod 15 and connects the thrust reverser cover 5 to the mast 1.

FIG. 11 shows that the actuator 35 is situated substantially below the joining rim 25 of the covers 4 and 5. It is clear that the hinges 40 and 47, disconnected in turn, must be formed by removable elements. In a particular design, visible in FIG. 12, these elements can comprise a socket 48 on the stem 39, a socket 49 on a fork 50 on the turbine cover 4 and a last socket 51 on a fork 52 for attaching the thrust reverser cover 5. These last two sockets are provided with grooves 53 and 54. In addition, the hinges are supplemented by a removable articulation shaft 55 provided with a circle of balls 56 at its end; a key 57 disposed in the middle of the articulation shaft 55 can be turned or pressed in order to cause the balls 56 to partially leave housings in the articulation shaft 55 where they are held or on the other hand to allow them to return into these housings. The first hinge 40 is formed when the articulation shaft 55 is pushed into both the sockets 48 and 49 and the key is turned in order to cause the balls 56 to project into the groove 53, which prevents the accidental disconnection of this hinge 40; the second hinge 47 is established in a similar fashion by slipping the articulation shaft 55 into the sockets 48 and 51 and causing the balls 56 to project into the groove 54.

A system controlling the actuators 5 is completely depicted in FIG. 13 and comprises an electric motor 60, a hydraulic pump 61, an oil reservoir 62, a supply valve 63 for the actuators 35 which however has a state allowing the oil to return to the reservoir 60 and, for each of the actuators 35, an opening valve 64. The switch 42, which is not depicted in FIG. 13, controls both the running of the motor 60 and the opening of the valves 63 and 64 in order to control the deployment of the actuators 35. It has, however, a supplementary state in which it reverses the switching of the supply valve 63 in order to retract the actuators 35, a second supplementary state in which the opening valves 64 are closed again in order to keep the actuators 35 in the state reached, isolating them from the control system. The use of a pressurised reservoir or an accumulator would make it possible to produce the opening forces for the actuators 35 in spite of damage to the electric motor 60 or pump 61, simply by opening the valves 63 and 64.

As a variant, a manual pump 65 could be added. It would be connected to the pipes 41 by a connection similar to the connection 31 and would stand in for the motorised pump 61 in case of need.

This pump, autonomous with regard to oil capacity, is the one conventionally used today for opening the thrust reverser cover 5. It is connected to a rapid coupling 70, secured to the motor, automatically closed when it is disconnected and automatically opened when it is connected to the manual pump 65. By acting on this autonomous manual pump, an operator can sequentially open the turbine covers 4 and then the thrust reverser covers 5 in accordance with a method identical to that of the electrical pump 61 but without use of the hydroelectrical control and power assembly, the valves 64 being kept closed. The closure of the covers 4 and 5, which entails draining the actuators 35, is obtained by opening a cock 73 situated on the manual pump returning the oil to the reservoir 72 of the manual pump 65. In all these embodiments, filters 71 are provided on the oil ducts between the reservoirs 62 or 72 and the actuators 35, upstream or downstream of the pumps.

Other embodiments are disclosed in the following figures: the stem 39 of the actuator 35 can thus be replaced by a longer stem 39', whose distal segment, here 44', carries two sockets 48₁ and 48₂ stepped over its length instead of a single one as in the embodiment disclosed up until now. This actuator is depicted in FIG. 23. The steps of opening the covers 4 and 5 are illustrated in FIGS. 14, 15 and 10, which correspond respectively to FIGS. 4, 8 and 10 in the previous embodiment; the difference between the two methods consists of the fact that the first hinge 40 is formed with the socket 48₁ furthest away from the articulation 36, whilst the second hinge 47 is formed with the other one of the sockets 48₂: the second hinge 48 is therefore further away from the top edge 10 of the thrust reverser cover 5, articulated on the mast 1, than the first hinge 40 was from the top edge 9 of the turbine cover 4. This geometrical situation enables the actuator 35 to more easily lift the thrust reverser cover 5, which is heavier than the previous one, by virtue of the greater lever arm.

If this advantage is not sought, drilling several parallel sockets along the stem 39 or 39' of the actuator 35 nevertheless makes it possible, by choosing the sockets of the stem with which the hinges 40 and 47 are formed, to regulate the angle of opening (X or Y in FIG. 16) of the covers 4 and 5.

Another possible modification consists of replacing the forks having two support flanges for the covers, for example that (50) of the turbine cover 4, with a simple pivot where the socket 49 of the hinge 40 is entirely hollowed out in a single protrusion 75. FIGS. 17 and 18 show this. Here too, the connection of the actuator 35 to one or other of the covers 4 and 5 is consecutive upon a rotation of the actuator 35 in a vertical plane about the articulation 36.

However, more complicated movements can be imposed on the actuator 35: FIGS. 19 and 20 show that the hinges 40 and 47 can be offset in the longitudinal direction of the aircraft, which imposes an additional rotation β in a horizontal plane of the actuator 35 in order to pass from one to the other. The forks can also be replaced by protrusions, which means that the two previous modifications can be combined, which is depicted in FIGS. 21 and 22.

All the other combinations of these variants, and others which would be within the capability of a person skilled in the art, come within the definition of the invention; one of them, where the actuator with two sockets 48₁ and 48₂ of FIG. 23 is employed in the embodiment of FIGS. 21 and 22, is illustrated in FIGS. 24 and 25.

What is claimed is:

1. An aircraft engine nacelle comprising:

two adjacent covers, which are special in that a first one of the covers partially overlaps a second cover, imposing an order of opening and closing; and an opening actuator connected to the first cover in a position where the first cover is closed by a first hinge and articulated by a second hinge on the engine, wherein by rotation about the second hinge, the actuator can be successively connected to the first cover or to the second cover without being disconnected from the second hinge and without disconnecting a control system of the actuator, and wherein the actuator is controlled by a control element concealed by the first cover, when the first cover is in the locked position.

2. An aircraft engine nacelle according to claim 1, wherein the control element is made accessible to an operator by flexing the first cover.

3. An aircraft engine nacelle according to claim 1, wherein the actuator comprises a stem provided with two stepped hinge elements respectively forming the first hinge and a removable hinge.

4. An aircraft engine nacelle according to claim 1, further comprising a system of controlling the actuator including a pump, a liquid reservoir and a valve allowing passage of liquid from the reservoir to the actuator through the pump and a direct passage of liquid from the actuator to the reservoir.

5. An aircraft engine nacelle according to claim 4, wherein the system controlling the actuator also comprises an auxiliary pressurised liquid reservoir.

6. An aircraft engine nacelle according to claim 1, wherein the actuator is an electrical actuator controlled by a switch constituting the control element.

7. An aircraft engine nacelle according to claim 1, wherein the actuator can rotate in a plane about the second hinge.

8. An aircraft engine nacelle according to claim 1, wherein the actuator can rotate in several planes, the second hinge being produced as a swivel.

9. An aircraft engine nacelle according to claim 1, wherein the hinges for connecting the actuator to the covers comprise fork elements fixed to the covers.

10. An aircraft engine nacelle according to claim 1, wherein the hinges for connecting the actuator to the covers comprise simple pivots, establishing cantilever connections, fixed to the covers.

11. An aircraft engine nacelle according to claim 1, wherein the covers each have an edge articulated on a suspension mast on the nacelle.

12. An aircraft engine nacelle according to claim 1, wherein the covers each have an edge articulated on a fixed element secured to the mast and engine.

13. An aircraft engine nacelle according to claim 1, wherein the covers are positioned adjacent to one another along the axial axis of the engine.

14. An aircraft engine nacelle according to claim 1, wherein the control element is made accessible to an operator by means of free travel obtained by the fact that the actuator comprises a stem formed in two segments.

15. An aircraft engine nacelle according to claim 1, wherein the first of the two segments is engaged in a cylinder of the actuator and the second of the two segments carries the first hinge and the first and second segments which enables the segments to move in an axial direction with respect to each other.

* * * * *